June 30, 1936. W. P. SCHARR 2,046,001
BILL FEED ATTACHMENT
Filed June 30, 1934 8 Sheets-Sheet 1

June 30, 1936.    W. P. SCHARR    2,046,001
BILL FEED ATTACHMENT
Filed June 30, 1934    8 Sheets—Sheet 5

INVENTOR—
Walter P. Scharr
BY
A. C. Mabry
ATTORNEY—

June 30, 1936.  W. P. SCHARR  2,046,001
BILL FEED ATTACHMENT
Filed June 30, 1934  8 Sheets-Sheet 6

INVENTOR
Walter P. Scharr
BY
A. C. Maby
ATTORNEY

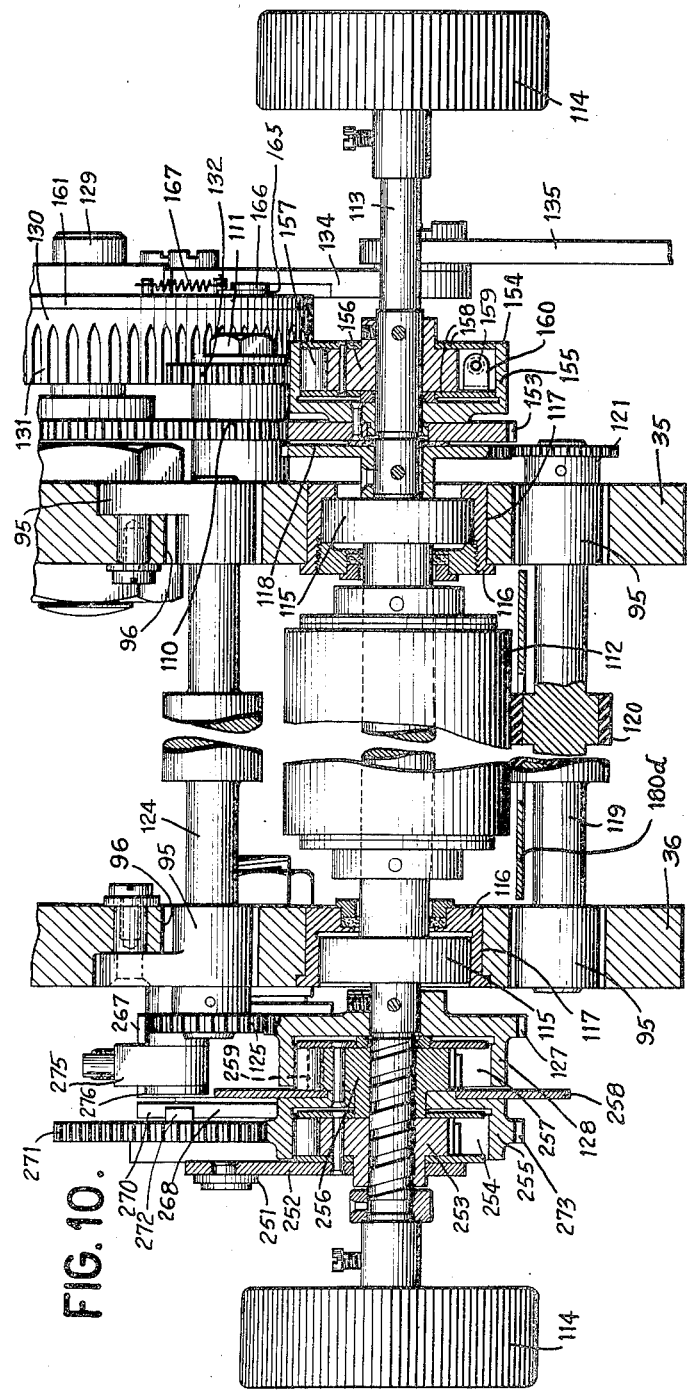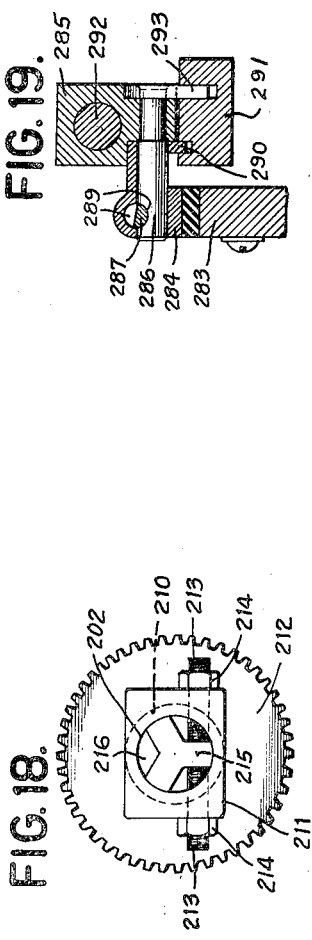

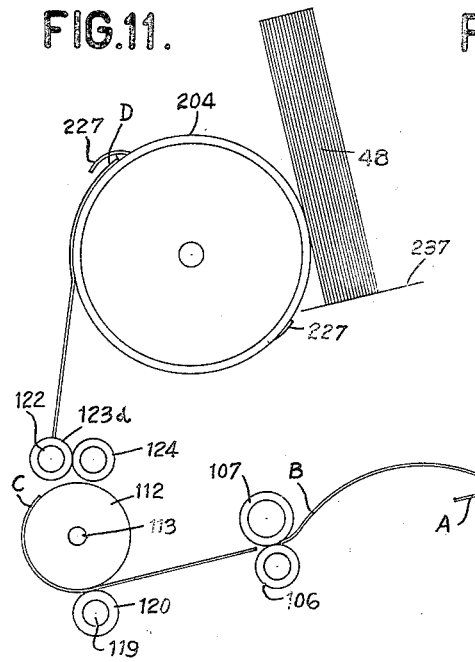
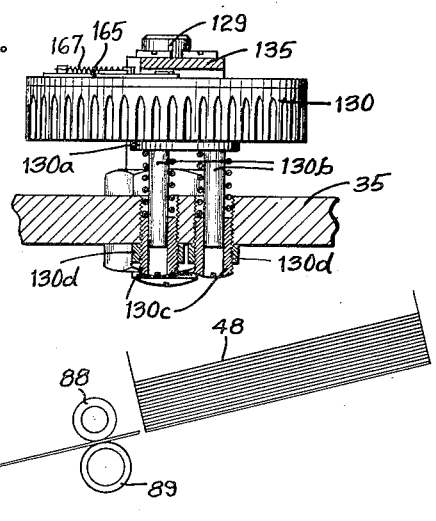
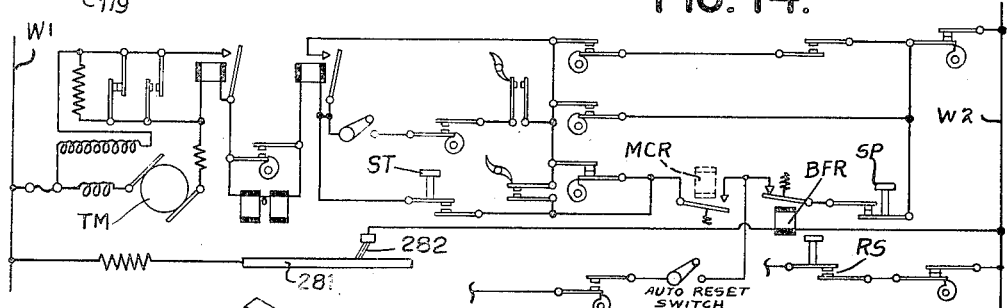
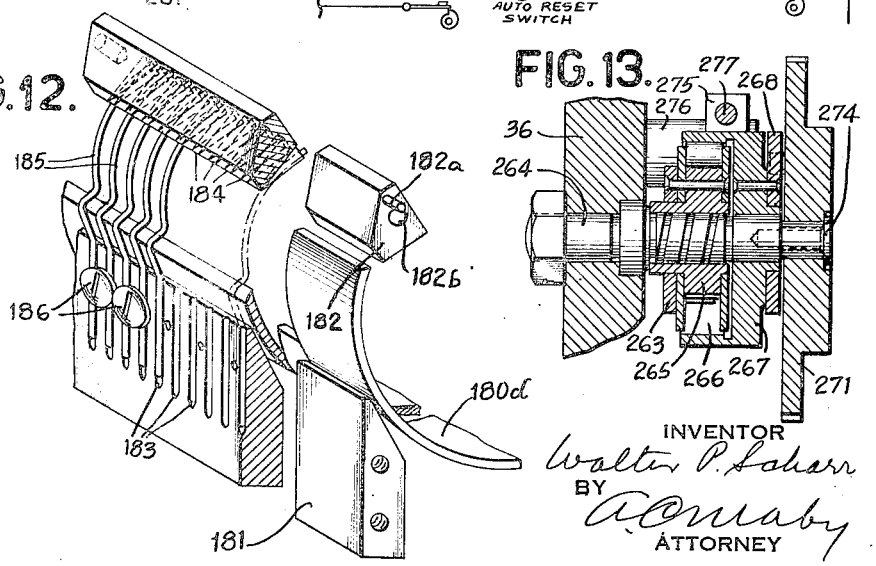

Patented June 30, 1936

2,046,001

UNITED STATES PATENT OFFICE 2,046,001

BILL FEED ATTACHMENT

Walter P. Scharr, Endicott, N. Y., assignor to International Business Machines Corporation, New York, N. Y., a corporation of New York Application June 30, 1934, Serial No. 733,224

24 Claims. (Cl. 271—4)

This invention relates to accounting machines in general.

A broad object of the invention is to provide an improved automatic bill feeding device for accounting machines.

Another broad object is to provide a bill feeding device wherein the bill is initially inserted by very simple mechanical means which dispenses with unreliable vacuum or friction feeding devices.

An object is to provide a bill feeding device which is capable of feeding wide short bills such as are commonly used by public utility corporations in billing for gas, electric power, water, and telephone services.

Another object is to provide a bill feeding device in which jerky motion is eliminated and all the parts operate smoothly and positively.

An object is to provide a bill feeding attachment in which the mechanism for producing the proper head spacing is simpler than in prior bill inserting mechanisms and may be adjusted to a very fine degree, that is, other than by fixed multiples of the minimum line space distance, and by any amount less than a line space distance.

A further object is to provide a bill feeding device which is a compact unit and can be easily attached to accounting machines of all kinds without material alteration of such machines.

Still another object is to provide a bill feeding device which is arranged so that it can be raised for inspection of both the bill feed mechanism and the machine to which such device is attached, without disconnecting any of the mechanisms of the device or disarranging them in any way.

A specific object is to provide a flexible platen driving mechanism for accounting machines whereby the feed may be varied at will whether the feed is for ordinary item line spacing, total spacing, or bill insertion and ejection, and whereby the line spacing mechanism, total spacing mechanism, and bill inserting and ejecting mechanism do not interfere with each other.

Another specific object is to provide novel driving means for the item line spacing mechanism, total line spacing mechanism, and bill insertion mechanism which means is completely adjustable over a wide range, and not limited to fixed tooth spacings as is usually the case where ratchet-and-pawl mechanisms are used.

A further specific object is to provide a device for preventing operation of the machine when bills fail to feed as when the bill supply hopper becomes exhausted or a bill jams in said hopper.

Another specific object is to provide a novel combined ribbon guard and paper guide to protect the bills from smudging and to ensure proper feeding of the bills past the printing line.

Other objects, advantages and features will be specifically mentioned in the following description and claims, or will be apparent from a study of the description, claims and drawings.

In the drawings:

Fig. 10 is an enlarged vertical section on line 10—10 in Fig. 2.

Fig. 11 is a diagram to illustrate the cyclic feeding of bills.

Fig. 12 is a perspective view of the ribbon guard and paper guide.

Fig. 13 is an enlarged vertical section on the line 13—13 in Fig. 2.

Fig. 14 is a wiring diagram.

Fig. 15 is an enlarged vertical section showing the throat blocks and throat knives.

Fig. 17 is an enlarged vertical section of one of the adjustable feed rolls.

Fig. 18 is a detail view of certain driving connections for the stacker drum.

Fig. 19 is an enlarged vertical section on the line 19—19 in Fig. 9; and

Fig. 20 is a plan view partly in section of the driving clutch.

Figure 1:
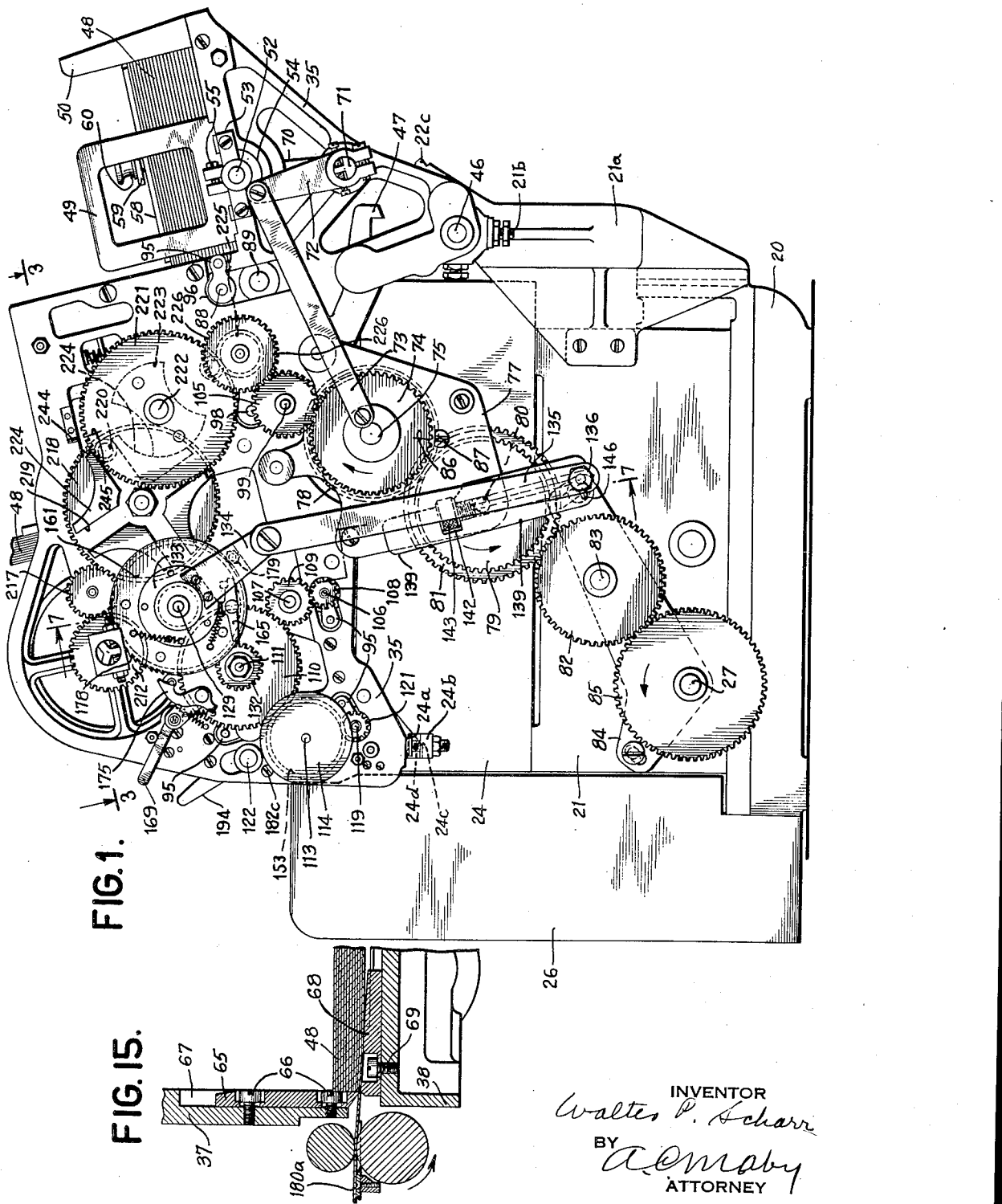
Fig. 1 is a right side elevation of the bill feeding mechanism and printing unit.

Purely as a matter of convenience in description the bill attachment has been illustrated in the drawings as applied to an electrical accounting and statistical machine now well known in the art as the "International" electric accounting machine. The basic principles of operation of this machine are described in numerous patents to Herman Hollerith and others, and the machine shown in general outline in Figs. 1, 2, and 4 may be the same as the ones described in Letters Patent No. 1,822,594, No. 1,762,145, and No. 1,379,268 which are merely representative of the many patents describing this type of machine. As the mechanism of the machine itself forms no part of the bill feeding attachment only a few details of such machine will be given herein to enable those skilled in the art to understand how the bill feeding attachment may be applied to a conventional accounting machine.

The numeral 20 (Fig. 1) indicates the main frame of the accounting machine on the top of which are secured right and left side frames 21, 22, respectively, which support the usual Hollerith printer control magnets 23 (Fig. 4) and associated parts of the printing mechanism, the printing magnets being mounted in the side frames 24 of a magnet unit carried by frames 21, 22. These magnets 23 control type-bars 25 in the manner described in the cited patents, the printing line being generally designated in Fig. 4 by the arrow P. The type-bars, as usual, are protected by a housing 26. A shaft 27 (Fig. 1) projecting through the frame 21 is known as the total shaft and, as described in the cited patents, makes one complete revolution for each total cycle initiated in any of the ways described in said patents.

This shaft is driven by the usual resetting motor and, as will be seen later herein, provides most of the power for operating the bill feeding attachment, the exception being the mechanism for line spacing item imprints while listing items derived from the usual Hollerith perforated control records.

The latter mechanism is operated by a shaft 28 (Fig. 2) which is rocked in a counterclockwise direction while the type-bars 25 are rising preparatory to printing an item or total. Shaft 28 carries an arm 29 having a pin 30 which abuts a shoulder in an assembly 31 pivoted at 32. A pin 33 carried by an arm 34 forming part of assembly 31, travels from left to right in an arcuate path each time shaft 28 is rocked as described, and operates the item line space mechanism of the bill feed attachment, as will be seen later herein. Assembly 31 is described in the cited patents and in them operates the platen line spacing mechanism through a link which is connected at the point 34 to assembly 31.

The manner in which shaft 28 and arm 34 operate the bill feeding attachment will be brought out more fully hereinafter at the proper places.

It will be seen that the operating connections of the bill feed attachment to the accounting machine are very simple which makes it an easy matter to connect the attachment to the accounting machine. It is plain that these simple connections make it possible to attach the bill feed attachment to accounting machines other than the one shown, such as any motor operated adding machine in which banks of type bars like 25 cooperate with a platen to print items and totals.

The bill feed attachment is a self contained unit the entire mechanism of which is supported by a rigid frame work comprising right and left side frames 35, 36, (Figs. 1 to 3), respectively, a vertical cross frame 37, (Figs. 3 and 4) a horizontal cross frame 38, and several cross bars 39 to 45. This framework is pivotally mounted on two brackets 21a, 22a, (Figs. 1, 2, and 4), secured to frames 21, 22, the pivots being a shaft 46 carried by the brackets 21a, 22a. The shaft 46 may be adjusted vertically and horizontally by means of four adjusting screws 21b, 22b, carried by the brackets 21a, 22a, respectively. Thus any slight inaccuracies in the machinery of the parts or the drilling of the holes for brackets 21a, 22a, may be compensated and the bill feed attachment accurately aligned with respect to the type-bars 25.

A hook-shaped latch 47 is pivotally mounted in frame 36 and, when the front end (the left end, Figs. 1 and 4, or the right end Fig. 2) is raised to rock the bill feed unit approximately 54°, said latch snaps over a projection 22c on frame 22a and holds the bill feed unit in raised position to permit inspection, adjustment, or repair of any of the parts of said unit, the magnet unit 24°, or the type-bar operating mechanism. When the bill feed unit is in its normal or lowered position the front ends of frames 35, 36 merely rest upon the buffer-like heads of stop screws 24a threaded into the ends of a bar 24b loosely carried by side frames 24, the weight of the bill feed unit being amply sufficient to prevent displacement due to components of force exerted by the parts directly connected to shafts 27, 28.

Bar 24b is provided with two notches 24c which coact with the top inclined front edges of frames 24 to prevent displacement of said bar along its length and rests between the inclined edges of frames 24 and lugs 24d formed in said frame. The bar 24b is held in place solely by its own weight and the weight of the bill feed unit.

The bills are designated 48 in Figs. 1 to 4 and are relatively greater in width than in length like those commonly used by public utilities corporations in billing for public services. These bills have printed headings, advertising matter, general information, service rates, and so on, printed on the face and back, and also have suitable blank spaces or lines for the printing of items and totals by type-bars 25.

Figure 3:
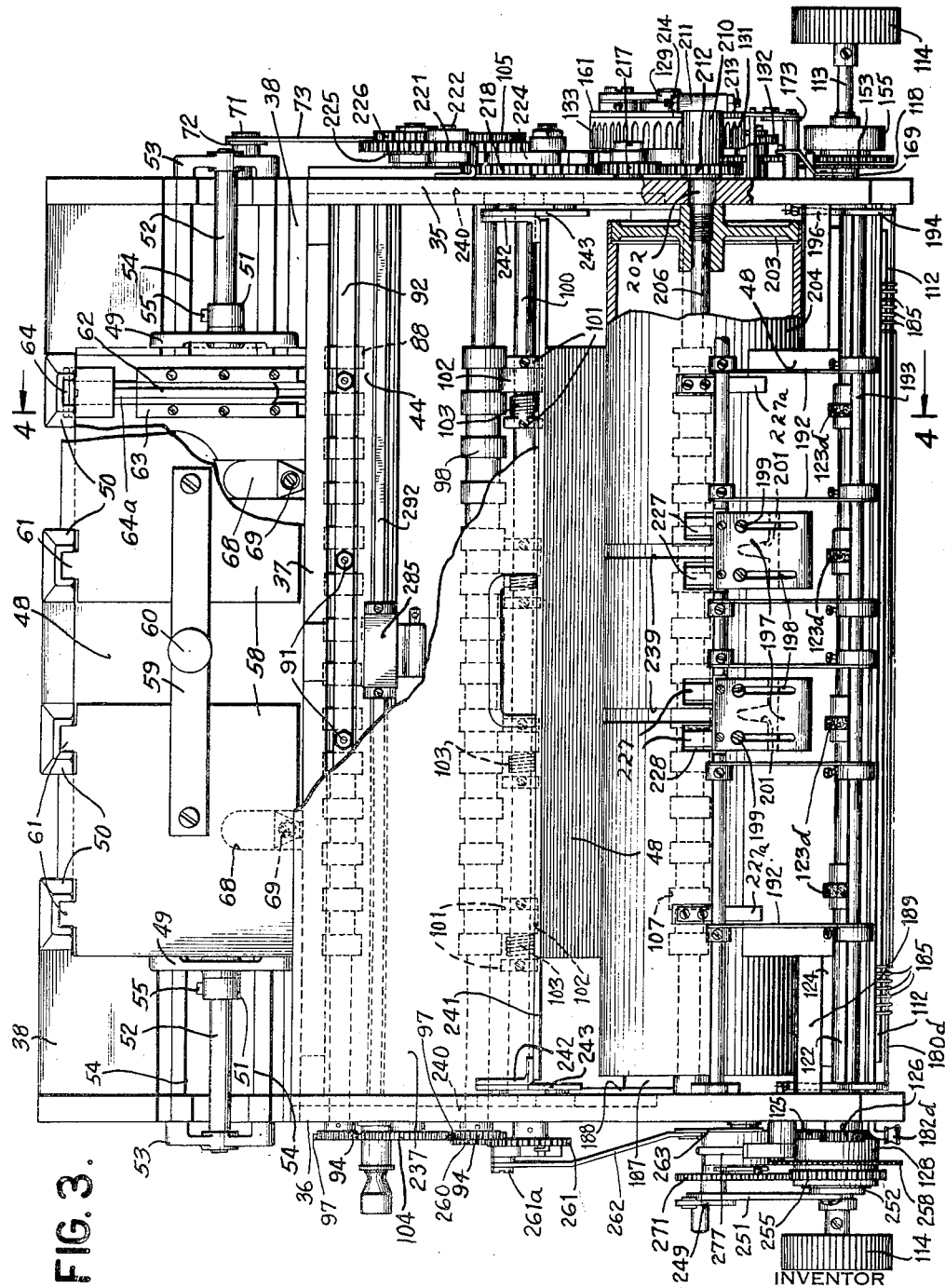
Fig. 3 is an oblique plan view on the same scale as Fig. 1 and looking in the direction of the arrows 3—3 in said figure, with parts of the machine broken away.
Figure 4:
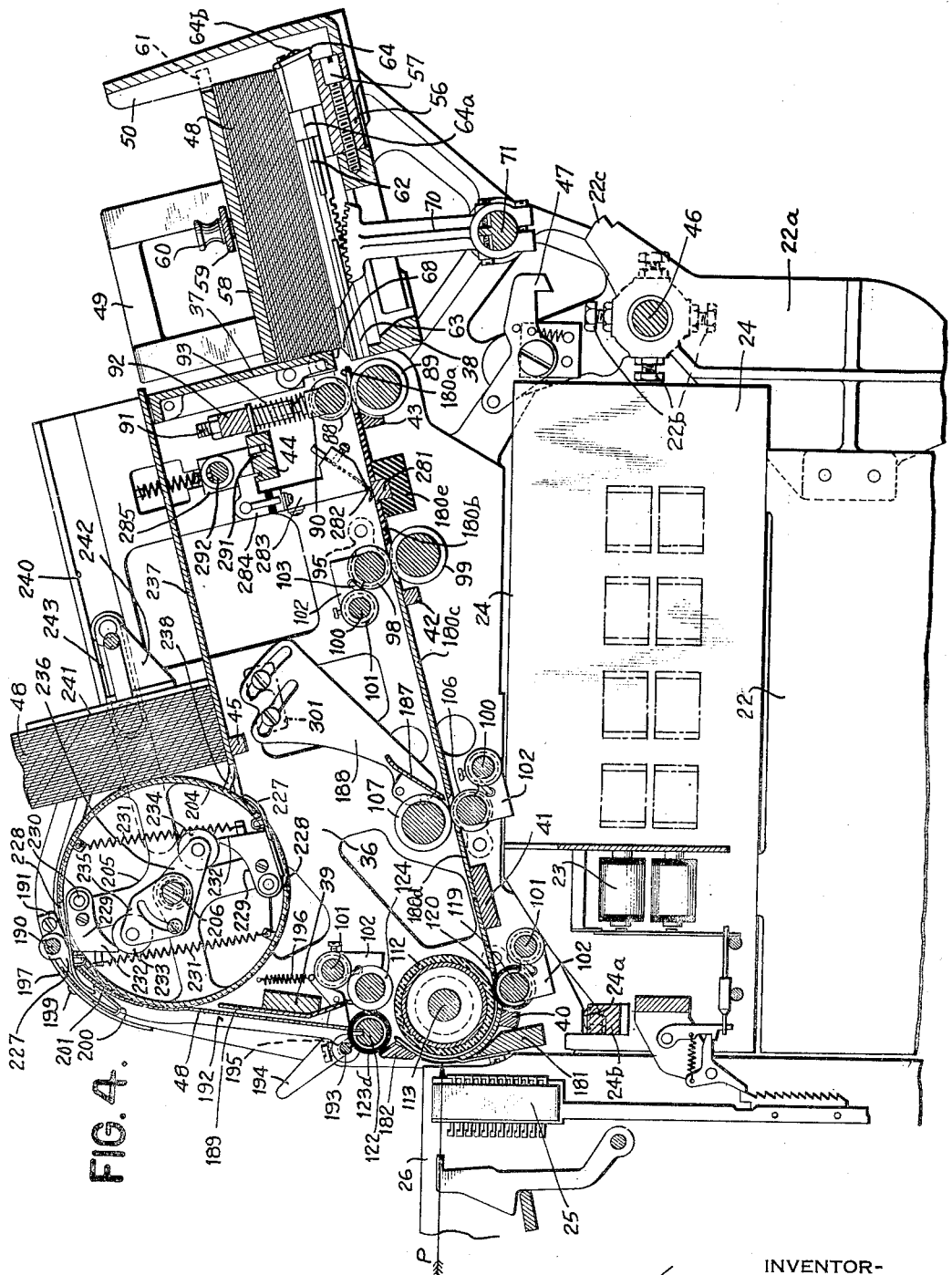
Fig. 4 is a vertical section on the line 4—4 in Fig. 3 and is drawn to the same scale as Fig. 3.

The supply hopper for the blank bills is formed by the rear face of cross frame 37 (Figs. 3 and 4), the top face of cross frame 38, two side plates 49, and several vertical posts 50 secured to the rear edge of frame 38, (Figs. 1 to 4) which form an open pocket in which the bills are placed face down with the top edges of the bills to the left (Figs. 1 and 4).

Side plates 49 have hubs 51 through which pass rods 52 supported by brackets 53 and the frame 38, the latter being hollowed or grooved at both ends as at 54 to accommodate the hubs 51 and rods 52. The hubs 51 are partly split by a slot and screws 55 provided by means of which the plates 49 may be clamped in any desired position along rods 52. This construction makes it possible to readily adapt the bill feed attachment to bills of different width.

The posts 50 are secured by screws (not shown) to spacer blocks 56 (Fig. 4) which are attached to the edge of frame 38 by screws 57. By substituting blocks 56 of various thicknesses, the bill feeding attachment may be accommodated to bills of different lengths as well as to different widths.

A weight is provided to keep the bills flat in the supply hopper. This weight is composed of two flat plates 58 (Fig. 3) joined by a cross bar 59 to the center of which is attached a knob 60 by means of which the weight may be lifted. Plates 58 have tongues 61 formed therein which are guided in rectangular grooves in posts 50.

The bills are removed from the supply hopper one at a time by means of picker mechanism which includes a number of picker slides 62 (Figs. 3 and 4) reciprocable in guides 63 secured to frame 38. A picker 64 is mounted on the rear end of each slide 62 by spacer blocks 64a and a screw 64b which picker projects upwardly a distance slightly less than the thickness of a bill so as to push the bill at the bottom of the hopper toward the left (Fig. 4) each time the picker slides 62 move in that direction. By substituting spacer blocks 64a of different lengths, the picker mechanism may be adapted to feed bills of different lengths. The supply hopper also is provided with a number of throat knives 65 adjustably secured by screws 66 in vertical slots 67 cut in the rear wall of frame 37 adjacent the lower edge of said frame. Coacting with throat knives 65 are throat blocks 68 (see Fig. 3 also) which are adjustably mounted in slots in the top face of frame 38 by means of screws 69. As many of these throat knives and blocks as may be necessary may be provided. They are adjusted relative to each other to provide a narrow gap or throat between their ends just sufficient to permit the bill at the bottom of the hopper to pass to the left when pushed in that direction by slides 62 and pickers 64.

The slides 62 carrying pickers 64 are operated by means of gear sectors 70 (Fig. 4) adjustably mounted on a shaft 71 which is journaled in frames 35, 36. An arm 72 (Fig. 1) is also adjustably secured to shaft 71 outside of frame 35 and to said arm is pivoted a link 73 which is pivoted to a gear 74 by means of a screw stud which is threaded into the hub of gear 74. The latter is secured to the outer end of a stub shaft 75 journaled in two spaced sub-frames 76, 77 secured to each other and to frame 35 (see Fig. 7). A gear 78 secured to the left or inner end of shaft 75 meshes with a gear 79 secured to a second stub shaft 80 also journaled in frames 76, 77. Fixed to shaft 80 is a gear 81 which meshes with an idler gear 82 losely mounted on a stud 83 fixed to a frame 84 (Fig. 1). This frame is adjustably mounted on the right side frame 21 by means of screws which pass through slots in frame 84 and are threaded into frame 21. Shaft 27 extends through a hole in frame 84 and rigidly mounted on shaft 27 is a gear 85 meshing with gear 82. The ratio of the gearing just described is such that stub shafts 75 and 80 turn one revolution for each revolution of shaft 27. Thus the slides 62 will move forward (to the left, Fig. 4) during the first half revolution of shaft 27 to push the bill at the bottom of the hopper to the left through the throat formed by throat knives 65 and throat blocks 68.

Gear 74 is provided with an index mark 86 (Fig. 1) which should be exactly in alignment with the bottom of a notch cut in a stud 87 carried by frame 77 when the link 73, arm 72 and certain other mechanisms, to be described later, are in their normal positions. When the bill feed unit is raised, as described, for purposes of inspection or repair, frames 76, 77 and the gearing carried thereby is raised with frame 35.

Naturally gears 81, 82 will become disengaged and in the course of the repair or inspection of the bill feed unit the mechanism mounted thereon might become displaced. Before lowering the bill feed unit the mark 86 can be placed opposite the bottom of the notch in stud 87 to ensure meshing of gears 81, 82 properly.

Each bill removed from the bottom of the hopper by pickers 64 is carried to the left (Fig. 4) far enough to be gripped by the first set of grooved feed rollers 88, 89. Roller 88 rests upon roller 89 and is spring pressed against roller 89 by means of a number of pressure shoes 90 having shanks loosely received in holes in the lower ends of studs 91 adjustably mounted in a cross bar 92 secured to frames 35, 36. Springs 93, interposed between shoulders in studs 91 and the shoes 90, press the latter down into the grooves in the roller 88 thereby holding rollers 88, 89 firmly in contact.

Figure 2:
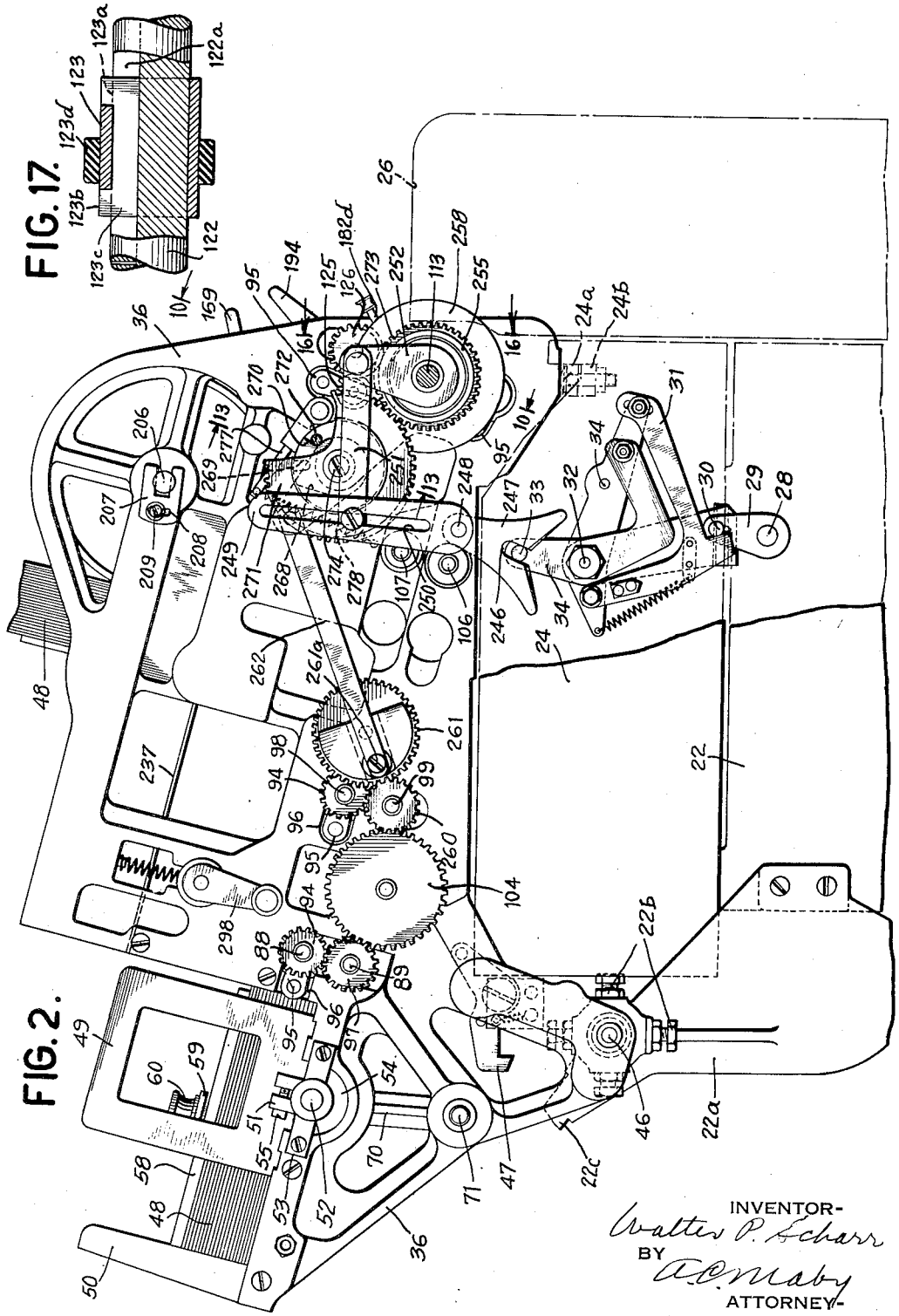
Fig. 2 is a left side elevation of the bill feed mechanism and printing unit and is drawn to a slightly larger scale than Fig. 1.

The roller 89 is journaled in bearings in the frames 35, 36 and is geared to roller 88 by means of pinions 94, 97 secured to the ends of rollers 88, 89 which extend outside frame 36 (Fig. 2). Roller 88 is journaled in bearings carried by short arms 95 (Figs. 1 and 2) pivoted to frames 35, 36, said arms being capable of a slight amount of pivotal movement in recesses 96 in frames 35, 36. This construction permits the use of bills of different thickness, it being merely necessary to change the adjustment of throat knives 65 and throat blocks 68 when it is desired to use bills of greater or less thickness than usual. A pinion 94 secured to the left-hand end of roller 89 provides a means by which the rollers 88, 89 may be rotated.

A second set of feed rollers 98, 99 is provided to the left of rollers 88, 89 (Fig. 4) and are identically constructed and mounted, roller 98, like roller 88, being mounted on arms 95. The pressure shoes for rollers 98, 99 are slightly differently constructed although the principle of operation remains the same. Parallel with roller 98 is a shaft 100 secured to frames 35, 36 and loosely mounted on the shaft 100, between collars 101 secured to said shaft, are a number of pressure shoes 102 (Figs. 3 and 4). A torsion spring 103, surrounding shaft 100 between each shoe 102 and one of collars 101, has its ends projecting into holes in the collar and shoe, respectively, and has the effect of forcing the end of the shoe down into a groove in roller 98 thus pressing rollers 98, 99 firmly together. A pair of pinions 94 are provided for rollers 98, 99, as in the case of rollers 88, 89, and a pinion 97 is also provided on the left end of roller 99. The pinions 97 of rollers 89, 99 both mesh with an idler gear 104 (Fig. 1) journaled on a stud carried by frame 36. A pinion 105 secured to roller 99 meshes with gear 74, and the ratio of the gearing comprising gears 74 and 105, and pinions 97 and 94 is such that the rollers 89, 99 make two revolutions per revolution of gears 74 and 79 in a direction to carry a bill to the left after it has been advanced from the supply hopper by picker 64. A blank bill 48 is thus advanced from the hopper and its top or leading edge carried to position A in Fig. 11 during each revolution of shaft 27.

Figure 5:
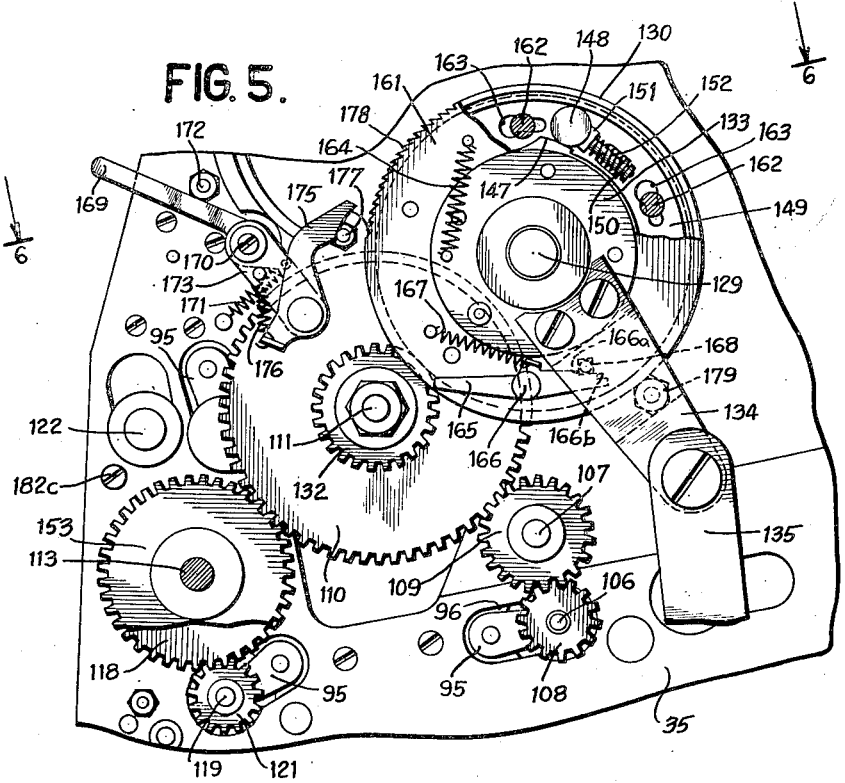
Fig. 5 is an enlarged right side elevation of part of the bill inserting and ejecting mechanism.
Figure 6:
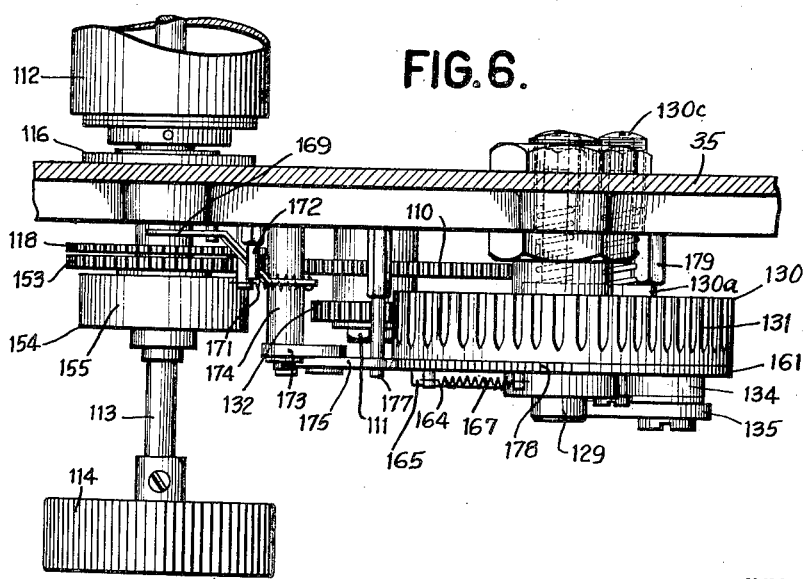
Fig. 6 is an enlarged plan view of the mechanism in Fig. 5, viewed in the direction of the arrows 6—6 in the latter figure.

A third set of feed rollers 106, 107 is provided which rollers are similar in all respects to the rollers 98, 99 except that the relation of the rollers and their pressure shoes is reversed. The right-hand ends of rollers 106, 107 are provided with meshed pinions 108, 109 (Figs. 1 and 5) similar to pinions 94, 97 and the pinion 109 meshes with a large idler gear 110 journaled on a stud 111 carried by frame 35 (Figs. 1, 5, and 6). Roller 106, like rollers 88 and 98, is mounted on arms 95 pivoted in recesses 96 in frames 35, 36.

A platen 112 is provided (Figs. 3, 4, 6, 10, and 11) which is secured to a shaft 113 and has the usual knobs 114 secured to said shaft by means of which knobs the platen may be turned manually (see Fig. 10). The shaft 113 is mounted in ball or roller bearings 115 which are mounted in carriers 116 pressed into holes 117 in the frames 35, 36. A gear 118 is fixed to the right-hand end of shaft 113. The platen 112, as is usual in accounting machines, has a surface of resilient material such as rubber to permit clear impressions to be had from the types on type-bars 25. Extending parallel with platen 112 and beneath it is a shaft 119 which may be provided with a number of roll surfaces 120 of resilient material or a roller like 88 may be provided instead. It is preferred to use resilient roll surfaces, however, as it has been found that rollers like 88 have a tendency to form grooves in the platen. Shaft 119 is mounted in arms 95 in exactly the same fashion as rollers 88, 98, 106, and is similarly provided with pressure shoes 102 (Fig. 4) on a shaft 101 extending parallel with the platen 112 and secured to frames 35, 36. Secured to shaft 119 is a pinion which meshes with gear 118.

Journaled in frames 35, 36 above platen 112 is a shaft 122 (Figs. 3, 4, and 17) which has a longitudinal keyway 122a between the bearings in said frames which support this shaft. Slidably mounted on shaft 122 are a number of bushings 123 having slots 123a at both ends (Fig. 17) which receive lugs 123b of keys 123c in keyway 122a. Lugs 123b prevent keys 123c from becoming disengaged from bushings 123. Pressed on bushings 123 are rings or roll surfaces 123d of rubber or other suitable resilient material. Keys 123c are bowed slightly and sprung into keyway 122a so as to exert sufficient pressure on the walls of the keyway to hold the bushings 123 frictionally in any position on shaft 122 to which they may be set manually.

Cooperating with roll surfaces 123d is a roller 124, preferably made of polished steel, which is journaled in arms 95 as in the case of rollers 88, 98, 106. A pressure shoe 102 at each end of roller 124 adjacent frames 35, 36 presses the latter firmly against roll surfaces 123d. A pair of pinions 125, 126 (Fig. 2) similar to pinions 94 provide a driving connection between shaft 122 and roll 124 at their left-hand ends. Gear teeth 127 in a driven clutch element 128 secured to shaft 113 mesh with pinion 126. It will be plain that rotation of platen shaft 113 in a clockwise direction (Fig. 11) will cause platen 112, shafts 119 and 122, and feed rollers 120, 123, 124 to rotate together and to feed a bill in position C toward position D in Fig. 11.

Figure 7:
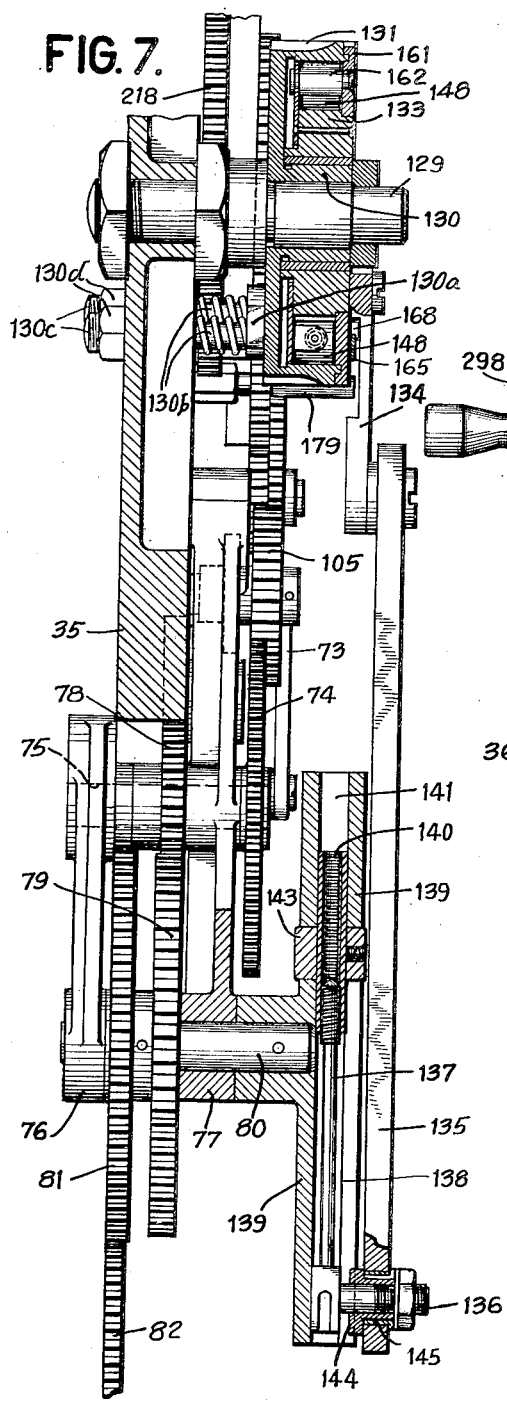
Fig. 7 is an enlarged vertical section of part of the bill inserting and ejecting mechanism taken on the line 7—7 in Fig. 1.
Figure 9:
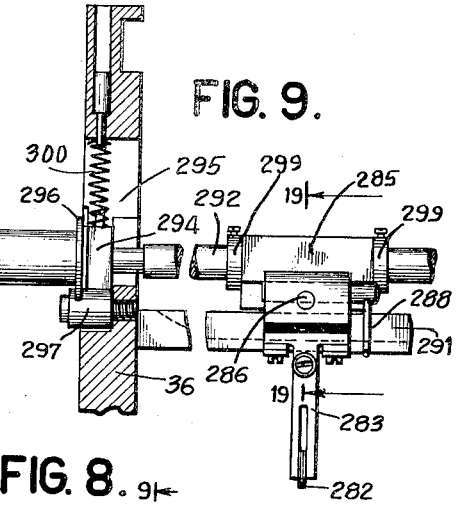
Fig. 9 is a vertical section on line 9—9 in Fig. 8.
Figure 8:
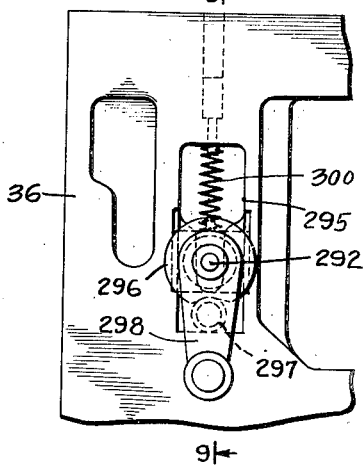
Fig. 8 is an enlarged left side elevation of the operating mechanism for the bill sensing brush.

It is possible to use a solid rubber or steel roller in place of the shaft 122 and the adjustable roller elements 123d. It has been found that a solid roller causes blurring of the impressions made upon the bill by type bars 25 due to the fact that items and totals are printed at such a high rate of speed that a solid feed roller contacts with the impression before the ink has had time to dry. This not only makes the bills smudgy and unattractive in appearance, but often renders part of them illegible and, when heavy record ribbons are used, the feed rollers often act as transfer surfaces and cause faint impressions of items to be printed on parts of the bill between items, in the heading, and so on. Naturally when a solid roller is used very poor appearing bills are produced. The adjustable roll elements 123d can be positioned to cooperate with parts of the bills between or to one side of active banks of type bars thereby eliminating the smudging, blurring, and transfer action of the feed rollers on the fresh impressions made on the bills. The platen 112 and the feed rollers 106, 107, 120, 123, 124 are all rotated together by a device which is one of the novel features of the invention and is best illustrated in Figs. 5 to 7.

Rotatably mounted on a stud 129 carried by frame 35 is a driven clutch element 130 provided with gear teeth 131 which mesh with a gear pinion 132 secured to gear 110. The driven clutch element 130 is recessed to receive a clutch driving element 133 which is loosely mounted on the hub of element 130 (Fig. 7).

Secured to element 133 is an arm 134 to which is pivoted a link 135. The latter is pivoted at its lower end (Fig. 7) to a crank pin 136 secured at right angles to the end of a rod 137 lying in a slot 138 cut lengthwise of a bar 139 fixed to the outer end of stub shaft 80. The other end of rod 137 is threaded into a tube 140 loose in a hole 141 bored lengthwise of the upper end of bar 139. The latter has a rectangular notch 142 (Fig. 1) in which is a knurled bushing 143. Tube 140 is pressed into bushing 143 and also secured by a set screw in said bushing. Obviously rotation of bushing 143 manually in the appropriate direction will cause crank pin 136 to move up or down in slot 138.

The head of crank pin 136 fits loosely in the T slot 138 and projects through the open part of such slot. Loose on the outer or right-hand end of the crank pin 136 is a bushing 144 having a shallow lug milled therein which rides in the open part of the T slot 138. Link 135 has a bushing 145 of bearing metal secured to its lower end which fits the bushing 144 loosely. A washer interposed between bushing 145 and the nut on the crank pin retains the link 135 loosely on bushing 144. When the nut on crank pin 136 is tightened the head of said crank pin and bushing 144 are forced toward each other to clamp the pin firmly to bar 139 thus firmly holding said crank pin in the position to which it has been moved by turning bushing 143. Thus no strain is placed on rod 137 or tube 140 when the bar 139 is rotated by stub shaft 80 during the operation of the bill feed attachment.

A pointer 146 is riveted to bushing 144 and may cooperate with suitable graduations on bar 139 or may provide an accurate center line for measuring the distance of crank pin 136 from the center of stub shaft 80 in adjusting said crank pin.

The driving element 133 is provided with five cam lugs like 147 (Fig. 5) extending radially of stud 129. Between each cam lug 147 and the periphery of driven element 130 is a roller 148 which is loose in the space formed between said lug and element 130. Riveted to the driving element 133 is a disc 149 which has five lugs 150 pierced therefrom and extending at right angles to disc 149 into the space between elements 130, 133.

Loosely and slidably mounted in a hole in each lug 150 is a pressure shoe 151 very much like the shoes 90 in general shape and interposed between lug 150 and the head of the pressure shoe is a spring 152 which causes the pressure shoe to press the coacting roller 148 into the space between the flange of element 130 and the adjacent cam lug 147. A washer riveted to the shank of each pressure shoe 151 prevents the parts from becoming disengaged when the assembly including elements 130, 133 are taken apart for cleaning or repairing. The space between each lug 147 and element 130 is slightly tapering so that rotation of element 133 in a clockwise direction (Fig. 5) tends to wedge rollers 148 between lugs 147 and element 130 as rollers 148 tend to ride up the inclined surface of the cam lug. This wedging action of rollers 148 locks elements 130, 133 together and causes the former to be rotated each time link 135 is drawn downwardly by crank pin 136. On the up stroke of link 135 the driving element 133 rotates in a counterclockwise direction and the rollers 148 have a tendency to roll down in inclined surface of cam lugs 147 and move away from element 130 so that element 133 merely turns idly without turning element 130.

The bar 139 is so positioned on shaft 80 that the crank pin 136 and link 135 move upwardly to their upper position during the first half revolution of shaft 80, which it will be remembered, turns one revolution each time the total shaft 27 turns a like amount. During the next half revolution of the total shaft, link 135 and crank pin 136 move downwardly to their lower dead center position. While this movement is taking place, feed rollers 106, 107, 120, platen 112, and feed rollers 123d, 124 will be driven by element 130 through the train of gears comprising gears 132, 110, 109, a gear 153 loosely mounted on shaft 113, a clutch 154 which is normally engaged, gears 118, 127, and pinions 121, 126, 108 and 125. A bill in position B will be carried to position C while one in position C will be fed to position D.

Clutch 154 is practically identical in construction with the clutch including elements 130, 133, except that in clutch 154, the recessed element 155 corresponding to element 130, is the driving element and the element 156 having five cam lugs is the driven element and is secured to shaft 113. Rollers 157 (Fig. 10) in clutch 154 are kept in place by two discs 158 riveted to element 156 and are pressed into the spaces between the element 155 and the cam lugs on element 156 by means of spring pressed plungers 159 slidable in brackets 160 carried by the left-hand disc 158. Disc 158 turns freely in the recess in element 155. The clutch 154 permits turning the platen forwardly by hand to feed a bill from position C (Fig. 11) toward position D without rotating the gearing between element 155 and element 130.

It has been found that there is a tendency for the clutch driven element 130 to rotate backwardly on the upward stroke of link 135 due to the friction of the driven element 130 and driving element 133 and connected parts, just enough to take up the slack in the gearing between the clutch and platen. If this movement were always constant no harm would be done but there is a possibility of slight inaccuracies being present in one or more of the gears, such as a slight eccentricity of the teeth. Due to the fact that the movements of element 130 are greatly multiplied by the gearing to platen 112, these slight inaccuracies may cause slight variations in the feeding of the paper which is very undesirable. Accordingly a brake device is provided to apply sufficient friction to driven element 130 to prevent the friction in the clutch parts from causing element 130 to rotate backwardly.

This device is shown in Fig. 20 and includes a brake shoe 130a bearing against the side of element 130 and secured to two pins 130b inserted at right angles to the back of such shoe. Pins 130b are slidably received in threaded sleeves 130c partly screwed into holes in frame 35. Springs 130d interposed between brake shoe 130a and the ends of sleeves 130c force the brake shoe 130a against the side of the element 130 with sufficient pressure to overcome the friction between the clutch driving and driven elements and other parts. Sleeves 130c are slotted as shown so as to be rotatable by means of a screw driven to adjust the pressure exerted by the shoe 130a on element 130. Lock nuts 130d provide a means of holding the sleeves 130c in adjusted position.

It may be necessary to turn the platen backwardly by means of a knob 114. Were no means provided to disengage either clutch 154 or the clutch comprising elements 130, 133, it would be difficult, if not impossible, to turn the platen backwardly by means of a knob 114 as this would result in rotating the gearing to element 130, element 133, crank 136, 139, gears 79, 81, 82, 85, and total shaft 27 backwardly. Rotation of the latter shaft backwardly would disarrange the timing of the total taking mechanism and be likely to damage certain cam actuated contacts operated by the total shaft. Rotation of arm 134 backwardly (Figs. 1 and 5) would be likely to be uncertain in amount and would either leave the arm in a dead center position with respect to link 135 and thus jam the total shaft 27 or place arm 134 so far to the left in Fig. 5 that movement of link 135 upwardly when the machine is restarted would cause the feed rollers 106, 107, 120, 123d, 124 and platen 112 to turn forwardly at the wrong time. At best, the load to be overcome to turn the platen backwardly might be too great for the operator's strength and an attempt to overcome this load would be likely to cause damage to the parts by straining them more than they were designed to stand.

These evils are overcome by the means for disengaging clutch 130, 133 which will now be explained with reference to Figs. 5, 6, and 7.

Loosely mounted on element 133 is a disc 161 (Figs. 5 to 7) which has five pins 162 riveted thereto and projecting into the spaces between rollers 148 and close to but not quite touching these rollers on the sides thereof opposite springs 152. The ends of pins 162 are grooved and received in slots 163 cut in disc 149. The slots 163 are enlarged enough to receive said pins and permit discs 161, 149 to be assembled in the position of Fig. 5 by first pushing the discs toward each other until slots 163 are opposite the grooves in pins 162 and then turning the discs relative to each other to the position of Fig. 5.

A spring 164 interposed between pins secured to discs 161 and element 133 normally tends to rotate said discs relative to each other in a direction to cause the pins 162 to move into the enlarged parts of slots 163. A latch 165 pivoted at 166 to disc 161 and operated by a spring 167 has two shoulders 166a, 166b of which shoulder 166a normally cooperates with a square stud 168 fixed to arm 134 and holds the discs 161, 162 in the position of Fig. 5. In this position pins 162 obviously can have no effect on rollers 148 which will be forced by springs 152 into contact with both lugs 147 and element 130, and the clutch 130, 133 will be effective to rotate the feed rollers and platen when arm 134 and link 135 descend.

If disc 161 is rotated in a clockwise direction (Fig. 5) far enough to cause shoulder 166b to engage stud 168 and hold disc 161 in displaced position, pins 162 will engage rollers 148 and push them clockwise relative to lugs 147 a distance sufficient to prevent the rollers from being wedged between lugs 147 and element 130 when the latter is rotated backwardly by backward rotation of the platen (counterclockwise, Fig. 5).

Disc 161 may be rotated manually by means of a lever 169 pivoted on a stud 170 carried by frame 35 and held by a spring 171 against a stop pin 172. An arm 173 is secured to lever 169 by means of a short sleeve 174 and carries a gooseneck pawl 175. Normally a spring 176, secured to the tail of pawl 175 and arm 173, holds the free end of pawl 175 against a guide pin 177 carried by frame 35. Opposite the end of pawl 175 disc 161 is provided with fine ratchet teeth 178 for a distance sufficient to ensure that, irrespective of the adjusted position of arm 134 and element 133, some of the ratchet teeth 178 will always be in position to be engaged by the end of pawl 175. When lever 169 is depressed manually, arm 173 will be rocked counterclockwise (Fig. 5) pushing pawl 175 upwardly until pin 177 drops into the recess behind the end of the pawl permitting the latter to engage teeth 178. Further movement of lever 169 will then result in moving disc 161 clockwise far enough to cause shoulder 166b to snap in front of stud 168. This movement of disc 161 causes the disengagement of clutch 130, 133 as described.

Latch 165 is automatically released when the total shaft 27 rotates to raise link 135 and arm 134. Adjacent the edge of disc 161 behind arm 134 (Fig. 5) is a pin 179 carried by a frame 35 and in the path of movement of the tail of latch 165 when shoulder 166b engages stud 168. As arm 134 moves upwardly rotating element 133 and disc 161 as a unit, the tail of latch 165 will be pressed toward stud 129 by pin 179 thereby releasing shoulder 166b from stud 168 and permitting spring 164 to move disc 161 back to the position of Fig. 5.

Bills, in travelling from right to left (Fig. 4) from the supply hopper to the platen, are supported between the feed rollers 88, 89, 98, 99, 106, 107 by means of a series of guide plates designated 180a to 180d in Fig. 4. Guides 180c and 180d may be made of metal and are supported by cross bars 40, 41, 42. Guide 180b is made of insulating material and is supported by a bar of insulating material 180e secured to frames 35, 36 between feed rollers 89, 99. Guides 180b, 180c meet beneath rollers 98, 99. Guide 180a is also made of insulating material and is supported partly by bar 180e and partly by bar 43. The right-hand edge of guide 180a is beveled to ensure that bills delivered by the picker mechanism to rollers 88, 89 will pass over said guide and not underneath. All of these various guides are apertured or slotted to permit the various feed rolls to contact.

The guide 180d curves forwardly and upwardly close to the platen 112 for a distance of approximately one fourth the circumference of the platen and terminates, for the greater part of its width, in a bevel just below the printing line P. Adjacent frames 35, 36 and at the ends of platen 112 guide 180d has tabs which extend upwardly a further distance as in Fig. 12.

The bill is guided from the printing line P to feed rollers 123d, 124 by a novel paper guide and inking ribbon guard best illustrated in Figs. 4 and 12. Extending crosswise of the bill feed attachment above and below platen 112 between frames 35, 36 are two bars 181, 182. Bar 181 is secured to frames 35, 36 and beveled in front of the curved edge of guide 180d to provide room for said guide and is provided with grooves 183 at spaced intervals to correspond with the narrow spaces between the type-bars 25.

Bar 182 is roughly triangular in shape, the apexes of two of the angles being slightly flattened and one of the faces of said bar opposite platen 112 is provided with long V-shaped notches or grooves 184 in the same plane as grooves 183. Into grooves 183 and 184 are laid guide elements 185 which are preferably made of tempered spring wire such as piano wire bent to the shape shown in Fig. 12. Each wire is clamped in place by the head of a screw 186 of which there are only half as many as there are grooves 183, said screws being threaded into holes in bar 181 in alternate spaces between grooves 183. The wires 185 are bent around the beveled edge of guide 180d so as to lie close to and hold a bill in contact with the platen 112.

The foregoing construction has the advantage of making it possible to arrange the type-bars in any desired way without requiring that a new paper guide and ribbon guard be made to suit each arrangement of type-bars. To make this clear it must be explained that standard "International" electric accounting machines are built with either five or seven groups (or "banks", as they are called) of ten type bars with a wider space between each bank of type bars than between the type bars of a group. Heretofore the ribbon guard and paper guide has been made of sheet metal in which an opening was punched for each bank of type bars to provide a rectangular space at the printing line through which openings the type elements strike in printing items and totals.

Many machines are built to a prospective user's specifications which may call for arrangements of the type-bars in groups of more or less than ten, as for instance, a user may wish a solid bank of alphabetical type bars and one or more banks of numeral type bars. Each of these special arrangements requires a different ribbon guard and paper guide and, if they are made of sheet metal as heretofore, it is obvious that at least a new die must be provided for each special ribbon guard entailing heavy expense for such a minor but nevertheless important part of the machine. The construction described herein makes it possible to avoid new dies when a special arrangement of type bars, different from any used before, is desired as the wires 185 can be arranged in any desired fashion. Also repair of the ribbon guard is facilitated as the wires 185 can be replaced or relocated without difficulty while the bill feed attachment is in raised position.

It has been found that bills occasionally jam and crumple while being fed around the platen making it necessary to remove the crumpled bill before others can be fed. This would be a difficult and irritating operation if bars 181, 182 were both secured to the frames 35, 36. Accordingly bar 182 is made removable to facilitate removal of crumpled bills.

The right-hand end of bar 182 has a pin 182a which loosely fits in a small hole in frame 35 and a hole 182b receiving the shouldered end of a screw stud 182c in frame 35 which stud supports the right-hand end of said bar, pin 182a preventing rotation of the bar.

Figure 16:
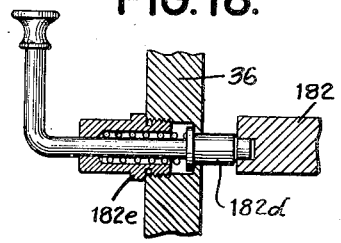
Fig. 16 is a vertical section on line 16—16 in Fig. 2.

The left-hand end of bar 182 is supported by the shouldered end of a plunger 182d (Fig. 16) slidably and rotatably mounted in a bushing 182e screwed into a threaded hole in frame 36.

Plunger 182d is bent as shown and provided with a finger piece by means of which the plunger may be drawn to the left against the force exerted by a coil spring interposed between a shoulder in the plunger and bushing 182e. To remove bar 182 it is merely necessary to draw plunger 182d to the left (Fig. 16) far enough to disengage the left-hand end of bar 182 which can then be pulled forward and to the left until pin 182a and screw stud 182c are disengaged from their respective holes. When the bar 182 is so removed the guide elements 185 spring forwardly permitting removal of the crumpled bill without much trouble.

Several cycles of shaft 27 are required before the first bill in the supply hopper reaches the platen and is in position to print the first item. The first cycle of shaft 27 carries the first bill to position A. During the first half of the next cycle of shaft 27, the first bill is carried to position B where it is buckled as shown in Fig. 11 between rollers 98, 99 and 106, 107. During the second cycle, the second bill is removed from the hopper and carried to position A. Both of these bills are fed by feed rollers 88, 89 and 98, 99, rollers 106, 107 not commencing to move until shaft 27 has turned approximately a half revolution.

During the second half of the second cycle of shaft 27, feed rollers 106, 107, 120, platen 112, and feed rollers 123d, 124 are turned by the action of crank 136, 139, link 135, and clutch 130, 133 and carry the first bill from position B to position C where the leading edge of said bill will be at or above the printing line P. By moving crank pin 136 away from the center of shaft 80 the distance the bills are fed above the printing line will be increased, and vice versa. If pin 136 is concentric with shaft 80 the bills will not be fed from position B to position C, whereas, if the pin is in the position of Figs. 1 and 7 the bills will be fed the maximum amount.

Pin 136 is made adjustable in order to accommodate the machine to bills having pre-printed headings of different heights to determine the point at which the first entry is made by type bars 25.

During a third cycle of shaft 27 the third bill from the hopper is fed to position A; the second to positions B and C, respectively; and the first bill is fed to position D, feed rollers 123d, 124 performing the latter function.

A deflector plate 187 (Fig. 4) is provided to ensure that each bill delivered to feed rollers 106, 107 by feed rollers 98, 99 will be properly guided to the former rollers. This deflector plate is supported by arms 188 adjustably mounted in frames 35, 36.

Provision has been made for using considerably shorter bills than those shown in Fig. 4. This requires reducing the size of the supply hopper and is partly accomplished by substituting shorter spacer blocks for the spacer blocks 56 and also similarly treating the picker 64.

An extra pair of feed rollers may also be provided between rollers 98, 99, 106, 107, where the bills are extremely short, these extra rollers being placed immediately to the right of rollers 106, 107 and driven by an idler meshing with pinion 109 (Fig. 5). The openings in the frame necessary to permit the addition of the above mentioned feed rollers are shown in Figs. 1, 2, 4, and 5.

Feed rollers 123d, 124 feed the bills to position D and in order to ensure that the bills reach this position and to permit overlapping of bills the rollers 123d are made up of rubber rather than polished metal. The trailing edge of each bill, due to its stiffness, tends to press lightly on the rubber roller surfaces 123d and be gripped thereby even after roller 124 has ceased to grip the bill.

The bills are guided to position D by a curved plate 189 (Figs. 3 and 4) secured to tie bar 39 and extending downwardly to the roller 124.

There is provided an adjustable front guide which is designed to permit a clear view to be had of each bill while it is in position D. This guide is best illustrated in Figs. 3 and 4.

A rod 190 is journaled in blocks 191 secured to the inside faces of frames 35, 36 and adjustably mounted on this rod are six curved links 192 which hang down in front of guide 189. The links 192 support a rod 193 along which said links are adjustable.

Pivoted to frames 35, 36 adjacent the ends of rod 193 are latches 194 each having a notch 195 (Fig. 4) adapted to engage rod 193 and prevent said rod and links 192 from swinging forwardly about rod 190 as a pivot. Springs 196 secured to the rear (right hand) ends of latches 194 hold the latter in the position of Fig. 4 thereby preventing accidental displacement of the guide due to vibration of the machine. The latches are extended forwardly enough to provide a manual lever or finger piece to release them when it is desired to remove a bill immediately after items and totals have been printed therein and it has been fed to position D.

Also secured to rod 190 is a pair of support plates 197 which are curved downwardly and are provided with vertical slots 198. Slidably mounted on the rear faces of the plates 197 by means of screws 199 in slots 198 are two guides 200 which have tongues 201 bent rearwardly and upwardly relative to the support plates 197. Guides 200 are adjusted to bring tongues 201 between the fingers of the bill stacker about to be described.

The links 192 may be adjusted along rods 190, 193 according to the width of the bills so that the leading edges will be guides without buckling and if possible should be adjusted so that all items and totals are clearly visible on a bill in position D. The function of guide 200 and tongue 201 will be explained more fully hereinafter.

The stacker is best shown in Figs. 3 and 4 while its driving connections are best shown in Fig. 1. Journaled in frame 35 (Fig. 3) is a stub shaft 202 which is screwed into a spider 203 secured to the stacker drum 204. The left-hand end (Fig. 3) of the stacker drum is secured to a spider 205 which is loosely mounted on a shaft 206 journaled at its left-hand end in frame 36 and at its right-hand end in a socket in spider 203. Shaft 206 is provided with two parallel slots or notches adjacent its left-hand end outside of frame 36 (Fig. 2) and these notches fit a slot in a plate 207. The latter has an arcuate slot 208 through which passes a screw 209 threaded into a hole in frame 36. By this means shaft 206 may be rotatably adjusted a limited amount.

Mounted on stub shaft 202 outside frame 35 is a sleeve 210 integral with which is a block 211 and a gear 212. Block 211 has two adjusting screws 213 having lock nuts 214 which screws abut opposite sides of one of three lugs 215 formed by grooves 216 in the end of stub shaft 202. Obviously this construction permits block 211 and gear 212 to be adjusted relative to shaft 202 by axial and rotational movement of block 211 to place screws 213 in cooperation with any one of the lugs 215. In each of the three possible positions of coarse adjustment permitted by lugs 215 there can be had a fine adjustment by means of screws 213. The purpose of this construction is to permit very accurate adjustment of the stacker drum and is advantageous when accommodating the bill feed attachment to bills of different sizes.

Gear 212 (Fig. 1) meshes with an idler gear 217 which in turn meshes with a large gear 218. This gear has four radial grooves 219 in the outer end of one of which grooves normally lies one of two anti-friction rollers carried by two diametrically opposite pins 220 on a gear 221. The latter is journaled on a stud 222 carried by frame 35 and has a Geneva locking plate 223 adapted to cooperate with locking surfaces 224 on gear 218. Gear 221 meshes with a pinion 225 secured to a gear 226 which meshes with gear 105. The ratios of the various gears just described is such that gear 221 makes one half revolution per revolution of shaft 27. During the first half-revolution of shaft 27 one of the pins 220 will rotate gear 218 one-quarter of a revolution. The ratio between gears 212, 217, 218 is such that drum 204 will turn one-half of a revolution for each quarter revolution of gear 218. In other words, the drum 204 turns one-half revolution during the first half-revolution of shaft 27 and is idle during the remaining half-revolution of said shaft.

The stacker drum 204 is provided with two sets of stacker fingers 227. There are four fingers 227 (Fig. 3) to each set and the sets are located on opposite sides of the drum. The fingers of each set project through four openings 228 in drum 204 and are secured to a casting 229 pivoted at 230 to the interior of drum 204. Springs 231 secured to drum 204 and castings 229 normally tend to rock such castings 229 in a fashion to cause all four fingers of each set to press against the surface of drum 204 adjacent openings 228. Castings 229 have cam fingers 232 by means of which the fingers 227 are controlled through two cam rollers 233, 234. Roller 233 is carried by an arm 235 rotatably mounted on shaft 206 adjacent an arm 236 secured to said shaft. Roller 234 is mounted on a downwardly and rearwardly projecting part of arm 236.

Arm 235 has an arcuate slot through which projects a screw stud threaded into a hole in arm 236. By this means arm 235 may be adjusted relative to arm 236 while the latter is capable of limited adjustment by rotating shaft 206 through the medium of plate 207 and screw 209 (Fig. 2).

Arm 235 is so adjusted that with the stacker drum in its normal position of Fig. 4 the free ends of the upper set of fingers 227 will be held by roller 233 away from drum 204. In this position of the fingers 227, a bill fed by rollers 123d, 124 will be guided upwardly by links 192 and tongues 201 until the top or leading edge of the bill is between drum 204 and the ends of fingers 227. This is the position D of Fig. 11.

Arm 236 is adjusted so that when drum 204 is in the position of Fig. 4, cam finger 232 of this set of fingers will have the position of Fig. 4 where one of springs 231 is holding the free ends of the lower set of fingers 227 in contact with drum 204.

Mounted on cross bar 45 and the top edge of frame 37 (Figs. 3 and 4), is a plate 237 which, with the inside upper faces of frames 35, 36, forms the storage hopper for the printed bills. The forward or left-hand end (Fig. 4) of plate 237 is provided with two slightly upturned tongues 238 which project into grooves 239 (Fig. 3) in drum 204. The front edge is also beveled (Fig. 4) and projects very close to drum 204 without actually rubbing. The fingers 227 of each set are arranged in two pairs (Fig. 3) and between the fingers of each pair is a groove 239.

The inside faces of frames 35, 36 are provided with grooves 240 (Fig. 4) which act as tracks to support and guide a follower plate 241 carried by brackets 242 secured to roller trucks 243, the rollers of which ride in grooves 240. As grooves 240 are inclined downwardly toward the front of the machine, (to the left, Fig. 4) the follower plate tends by the action of gravity to press against drum 204 the bills accumulated on top of plate 237.

Assuming a bill is in position D (Fig. 11) with its top edge between a set of fingers 227 and drum 204, the operation of the stacker is as follows: Drum 204 commences to turn when movement of shaft 27 begins as the result of initiation of a total cycle in the usual way. The free ends of the upper set of fingers 227 are moved by springs 231 toward shaft 206 as drum 204 turns, due to finger 232 following the contour of roller 233. Before drum 204 can move very far, however, fingers 227 will engage the bill and press it firmly against the drum 204. As the drum continues rotating it carries the bill with it and eventually the top edge of the bill will be brought into contact with the lugs 238. Shortly before this happens, roller 234 will engage finger 232 and have the effect of camming said finger 232 and fingers 227 away from shaft 206 whereby to release the bill. When the fingers 227 reach the lower position in Fig. 4 the top edge of the bill will spring to the right owing to a tendency of the bill to flatten. Thus at the end of the first half-revolution of shaft 27 a bill which was in position D when rotation of said shaft commences will have been placed in the storage hopper.

It has been found by experience that in stacking extremely wide bills the leading corners of a bill being stacked tend to fly outwardly away from the drum 204 due partly to centrifugal force and partly to windage caused by the air and drum moving relative to each other. This causes the leading corners of the bills to become "dog-eared" that is bent-over at the corners, when the bills are carried into the storage hopper. Naturally this makes the bills unsightly and is troublesome in other ways. To prevent the corners of the bills from springing away from drum 204 fingers 227a of spring metal are secured in shallow recesses in the drum and extend partly around and a spaced distance from the drum. The corners of the bills can move freely under the fingers 227a but are restrained from moving outwardly when the drum rotates during the stacking operation.

As bills accumulate in said hopper the follower plate will be gradually forced to the right (Fig. 4) until the capacity of the hopper is reached. If desired springs may be provided to press follower plate 241 toward drum 204.

It has already been stated that the supply hopper is adjustable to bills of different widths and lengths and that the picker 64 can be adjusted to correspond by changing the spacer blocks 64a. The stacker mechanism also must be changed to correspond as described, arm 235 and roller 233 being adjusted to suit the new position of the stacker fingers. In order to ensure that the Geneva drive mechanism comprising gears 218, 221 may be restored to their correct relation if displaced for any reason or by accident, there is provided an index pointer 244 which is opposite a mark 245 on gear 221 when the parts are properly timed.

Line spacing mechanisms for both items and totals are provided and are best shown in Figs. 2, 10, and 13. The item line spacing mechanism is operated by assembly 31 which is rocked counterclockwise each time the type-bars 25 rise to printing position. Pin 33 fits loosely in a slot 246 in an arm 247 secured to a short shaft 248 journaled in a suitable bracket (not shown) carried by frame 36. Arm 247 is outside frames 24 which, in turn, are between frames 35, 36 and shaft 248 extends outside of frame 36 where an arm 249 is secured to the end of said shaft. Adjustably and pivotally mounted in a slot 250 in arm 249 is one end of a link 251 the other end of which is pivoted to an arm 252 loosely mounted on the platen shaft 113.

Arm 252 (Fig. 10) is secured to the driving element 253 of a clutch 254 similar to clutch 154 and the driven element 255 of clutch 254 is secured to the driving element 256 of clutch 257. The driven element 128 of clutch 257, it will be recalled, is secured to shaft 113.

As shaft 28 (Fig. 2) rocks counterclockwise and the type-bars rise, assembly 31 and arm 34 will rock in a clockwise direction, and pin 33 will cause arm 247 and shaft 248 to rock in a counterclockwise direction. Link 251 will be drawn rearwardly (to the left, Fig. 2) thereby rocking arm 252 counterclockwise. As a result clutch element 253 (Fig. 10) drives element 255 and the latter, through element 256, drives element 128 and the platen shaft 113 in a direction to feed a bill toward position D (Fig. 11). The amount of rotation imparted to shaft 113 and platen 112 will depend on the adjustment of the left end of link 251 in slot 250 (Fig. 2) the minimum movement taking place when the end of the link is at the bottom of the slot and the maximum movement when the link is at the top of the slot.

Shaft 28 rocks once each listing cycle and once each total cycle and it will be noted that the feeding of the bill to line space items and totals takes place immediately before printing of the item or total as in prior machines.

Means is provided to release clutch 257 to permit rotating the platen 112 backwardly. This means consists of a disk 258 (Fig. 10) loosely mounted on a shoulder formed in element 255 and having five pins like 259 in front of the five rollers in clutch 128.

The edge of this disc is knurled to permit rotating it by hand in a direction to force the rollers out of wedging position in the clutch and operates in exactly the same fashion as the disc 161 of the clutch 130, 133 already described. No latch like 165 is provided for disc 258, however, and it must be held by one hand while the platen is being turned backwardly with the other hand.

Additional line spacing mechanism is provided which may be used to supplement that just described only during bill feeding and total printing cycles. This mechanism is driven by the feed roller 99 (Fig. 2) secured to which is a pinion 260 meshing with a larger gear 261 journaled on a stud carried by frame 36. A T-slot is formed in gear 261 which carries a T-block adjustable in said slot. One end of a link 262 is pivoted to the sliding block by means of the screw 261a which is used to clamp the block in adjusted position. The other end of link 262 is pivoted to an arm 263 rockably mounted on a stud 264 (see Fig. 13) secured to frame 36. Arm 263 is secured to the driving element 265 of a clutch 266 identical in principle of construction with clutches 154 and 254. The driven element 267 of clutch 266 is secured to an element 268 shaped like a cam and having a notch 269 and a shoulder 270 (Fig. 2). Also loosely mounted on stud 264 is a gear 271 having a pin 272 which may occupy a position just in front of shoulder 270. Gear 271 meshes with gear teeth 273 in the periphery of clutch element 255, and is held on the stud 264 by a screw 274. By loosening screw 274 gear 271 can be slid outwardly on stud 264 far enough to disengage pin 272 from the shoulder 270 of element 268 and place said pin in notch 269, or vice versa.

Coacting with the outer surface of element 267 of clutch 266 is a brake shoe 275 (Figs. 2 and 13) pivoted at 276 to frame 36. Secured to brake shoe 275 is a pin 277 extending upwardly and rearwardly parallel with frame 36 and attached to the free end of this pin and to a pin carried by said frame is a spring 278 which keeps the brake shoe in contact with element 267.

Gear 261 rotates a full revolution during one revolution of shaft 27. During the first half of such revolution link 262 moves forwardly rocking arm 263 in the same direction an angular distance depending on the distance of pivot screw 261a from the center of gear 261. Element 268 will be rocked a corresponding amount and if pin 272 is in slot 269 gear 271 will be positively rotated by said element thereby rotating platen 112 through clutch 128 an amount determined by the adjustment of link 262. Thus, the totals will be spaced a constant distance from the last item for each setting of link 262. Obviously the greater the distance to screw 261a from the center of gear 261 the greater will be the amount the platen is rotated. The maximum amount of rotation imparted to platen 112 by the line spacing mechanism driven by gear 261 is considerably greater than the maximum rotation which can be produced by the line spacing mechanism driven by shaft 28.

When it is desired to line space items and totals alike, link 262 is adjusted so that the screw 261a is concentric with gear 261 so that only the line spacing mechanism operated by shaft 28 will be effective.

If it is desired that totals be spaced from items a greater distance than that separating items, link 262 is adjusted so that screw 261a is eccentric the proper amount to produce the desired spacing between the last item and the total. Both line spacing mechanisms will operate together but due to the type of clutches used, the faster of the two mechanisms will predominate. In other words, if link 262 is adjusted to rotate the platen a greater distance than link 251, the movement of the latter will be merely idle. On the other hand, if link 251 is adjusted to rotate the platen more than link 262, the movement of the latter will be idle.

The pivot screw 261a need only be set a slight amount eccentric to gear 261 in order to produce a space after the last item greater than the space which is produced by link 251 and its operating connections.

When it is desired to print the total always on a predetermined line of the bill irrespective of the number of items, instead of at a constant distance from the last item, the pin 272 is placed in the position of Figs. 2 and 10 adjacent shoulder 270. As items are printed pin 272 will travel in a clockwise direction (Fig. 2) an increment for each item, due to rotation of gear 271 by clutch elements 253, 255. When the total cycle takes place link 262 will move forwardly and rock arm 263 and clutch elements 265, 267, and disc 268 a fixed amount. At some point in this movement shoulder 270 will strike pin 272 and rotate gear 271 until link 262 reaches the end of its forward excursion.

The platen will be turned a variable amount by the movement, depending on the number of items previously printed but will be arrested at a point determined by the position of screw 261a. The total will always be printed on the same line of the bill, provided of course the item receiving capacity of the bill has not been exceeded.

During the last half of each revolution of shaft 27 the link 262 and connected parts are restored to the position of Fig. 2. The brake shoe 275 exerts sufficient frictional force to prevent displacement of element 267 when arm 263 is restored to the position of Fig. 2 and also serves to prevent overthrow of the clutch element 267.

It should be noted that element 268 and pin 272 are not restored to the position of Fig. 2 but are left in a new position each time link 262 and arm 263 are restored. This does no harm as the only conditions to be satisfied are that pin 272 should be in notch 269 or abutting shoulder 270 at the end of each bill feeding cycle. These conditions are always satisfied by the manner of operating element 268 without the need of special restoring devices or mechanisms.

Naturally it is necessary to adjust the line spacing mechanisms so that when it is desired to print totals on a predetermined line, pin 272 will never get beyond the control of shoulder 270. This is accomplished by adjusting link 251 according to the number of items to be printed in the space allotted to items which must be enough less than the maximum feed imparted by link 262 to leave room for the total.

A large movement of element 268 is not required as bills for public service seldom have more than six items and a total under the worst conditions. An extreme case may be illustrated where a gas and electric service corporation bills its customers with current month's gas service, current month's electric service, unpaid balance of previous bills, repairs, installments on purchases of appliances, and the tax on electricity as separate items and a total of these all on seven lines of a single column of a single bill form.

One of the advantages of the line spacing and feeding mechanisms herein described is that it is not necessary that the bill forms be designed to fit the individual machine. The only vital conditions to be met are that the blanks or lines for the reception of items be spaced at equal intervals and uniformly centered for each new lot of bill forms furnished by the printer. New lots of bills need not be exactly like previous lots as after one supply of forms is exhausted and a newly printed lot furnished by the printers, only very slight changes in adjustment of the line spacing mechanism and bill feeding mechanism are needed to accommodate the bill feeding attachment to the newly printed blank forms. As the line space and bill feed mechanisms are not limited to fixed feeds as is the case where the conventional ratchet-and-pawl line space mechanisms common in accounting machines are used, the bill forms need not be accurately designed to fit the machine nor does the bill feed mechanism have to be redesigned or rebuilt when a change in bill design is desired. The cost of bill forms may be greatly reduced as the necessity for very accurate layouts is avoided.

The failure of a bill form to reach printing position due to exhausting of the supply hopper or the jamming of a bill in said hopper is very annoying and, aside from the loss of time necessary to remedy if observed, is likely to result in serious errors and a hiatus in the accounting system if not observed, particularly where serially numbered bills are used which must match the card groups. Means is provided to prevent starting the machine as a reminder to the operator to see that the supply hopper is filled, which means is also effective to stop the machine if a bill jams in the hopper or the latter becomes exhausted before all the record cards have passed through the machine. This means is shown in Figs. 2, 3, 4, 8, and 9.

Bar 180e supports a contact bar 281 which is slightly higher than the edges of guides 180a, 180b, but the edges of said bar are bevelled so as not to obstruct free movement of the leading edge of a bill fed by rollers 88, 89. Coacting with bar 281 is a brush 282 mounted in a brush holder 283. Normally brush 282 bears on contact bar 281 unless a bill is between feed rollers 88, 89, 98, 99 in which case said brush will be insulated from bar 281. Brush holder 283 is secured to and insulated from the underside of a block 284 which is removably mounted on a block 285. The latter has a pin 286 (see Figs. 9 and 19) which passes through a hole in block 284 and is riveted to block 285. Rotatably mounted in block 284 is a pin 287 carrying a short handle 288 by means of which pin 287 can be rotated. Pins 286, 287 are disposed at right angles to each other with pin 287 above pin 286 and both are provided with semi-circular notches 289. With pin 287 and handle 288 in the positions of Figs. 9 and 19 the solid part of pin 287 behind its notch 289 is in notch 289 of pin 286 and serves to lock blocks 284, 285 together.

When pin 287 is turned by handle 288 far enough to cause notches 289 to confront each other block 284 may be removed from block 285. Normally removal of block 284 is prevented by a lug 290 formed in block 284 which lug projects into a groove in a bar 291 secured to frames 35, 36. Block 285 is slidably mounted on a shaft 292 which may be raised, by means presently to be described, far enough for lug 290 to clear the groove in bar 291 and permit removal of block 284 and brush holder 283. Pin 286 also acts as a rivet to secure a tab or lug 293 in a recess in block 285 which lug projects downwardly into a second and deeper groove in bar 291. Lug 293 is long enough to prevent block 285 from rotating pendulously when lug 290 clears its groove.

Shaft 292 is rotatably mounted in blocks 294 vertically slidable in slots 295 formed in frames 35, 36. A cam 296 is secured to shaft 292 adjacent each block 294 outside frames 35, 36 and normally dwells in the cam rest on rollers 297 carried by studs mounted on frames 35, 36. A crank 298 is secured to shaft 292 outside of frame 36 and when this crank in turned a few degrees by hand the cams 296 cooperate with rollers 297 to raise both ends of shaft 292 simultaneously a distance sufficient for lug 290 (Fig. 19) to clear the groove in bar 291 and also lift brush 282 out of contact with bar 281. Lug 293, however, will not clear its groove. Thus the assembly comprising brush holder 283 and blocks 284, 285 cannot rock on shaft 292 to destroy the alignment of lug 290 with its groove. A shoulder in block 285 fits over the block 284 to prevent rotation of the latter on pin 286.

Block 285 may be adjusted lengthwise of shaft 292 by means of collars 299. Springs 300, guided by pins carried by frames 35, 36 (Figs. 8 and 9) and pins mounted on the tops of blocks 294, press on the blocks and prevent sticking and also resist removal of the blocks from the slots 295.

Fig. 14 is a fragment of the wiring diagram for a machine like that described in Patent No. 1,762,145, for instance. Brush 282 and contact bar 281 are in series with a bill feed control relay BFR between line wires W1, W2. The contacts of relay BFR are in series with the contacts of the usual motor control relay MCR. The latter is controlled as in said patent to prevent starting of the usual tabulating motor TM without first performing a reset cycle which is done by starting the usual resetting motor (designated RM in Patent No. 1,762,145) by depressing the usual reset key RS. Relay MCR is also effective to stop the motor TM when the usual automatic group control mechanism functions on a change in group classification designations in the control records to initiate a reset cycle. The total shaft 27 is driven by the resetting motor. The usual modes of operation of the motor TM and the resetting motor RM are described in the patents mentioned hereinbefore. Obviously the contacts of relay BFR will have virtually the same effect as the contacts of relay MCR so far as the operation of motor TM is concerned.

It takes one reset cycle followed by two card feeding cycles and a second reset cycle to bring the first perforated control record into a position to begin the first item printing cycle. Assume that the machine is about to commence tabulating or listing items on a series of perforated records, and that a batch of blank bills has been placed in the supply hopper. Since brush 282 is touching the contact bar 281 the contacts of relay BFR will be kept open preventing starting of motor TM irrespective of the condition of relay MCR.

During the first reset cycle, relay MCR closes its contacts and also a bill is fed from the storage hopper to position A insulating brush 282 from contact bar 281 and deenergizing relay BFR. At the end of this cycle the first bill will be in position A and the contacts of relays MCR and BFR will be closed.

Two card feeding cycles can now take place since motor TM can be started and will be followed by the second reset cycle. During the first half of the latter cycle the first bill travels to position B while the second bill travels toward position A, then, during the second half of the cycle, the first bill travels to position C, while the second bill reaches position A.

At the end of the second reset cycle the first bill will be in a position to receive the first item from the first record card and the latter will be in position to commence the first item listing cycle.

If the supply hopper should become exhausted a bill will not be removed from the hopper during a reset cycle with the result that no bill will be in position A when the last bill from the hopper is fed to position C so that relay BFR will be energized, opening its contacts to prevent either automatic or manual restarting of motor TM at the end of such reset cycle. The same thing happens when a bill jams or crumples by reason of its failing to pass between throat blocks 68 and throat knives 65. As the circuit for automatically starting the reset motor usually extends through the automatic reset switch and stop key contacts SP, the opening of the contacts of relay BFR will also have the effect of preventing automatic resetting of the machine when all the items have been listed on the last bill.

Key RS, however, can be depressed manually to initiate a total cycle during which a total is printed on the last bill and the latter fed to position D. If the bills are not very long (length being measured in the direction of feed) the key RS can be depressed again to initiate another total cycle during which the last bill is carried to the storage hopper. If bills are longer than a predetermined amount during this last cycle the last bill is only partly stacked and still another total cycle must be initiated to finish stacking the last bill.

When the last bill is fed to position C, no bill will be present between brush 282 and bar 281 and it is necessary to turn handle 298 to raise brush 282 and then depress key ST to start motor TM in order to list the items on the last bill.

It is sometimes desired to use roll paper or connected blank forms instead of the individual bills. In order to permit the use of paper rolls or connected forms plate 237 and bar 45 may be made removable and a pair of blocks 301 (shown in dotted lines, Fig. 4), one on each frame 35, 36, are provided. Blocks 301 may be fastened to frames 35, 36 by the screws holding arms 188 to said frames, said arms being temporarily removed for the purpose. Blocks 301 have notches adapted to loosely support the ends of a rod carrying the paper roll or a guide roller for the connected forms. In order to permit plate 237 to be easily removed, bar 45 may be secured to such plate and removably mounted in frames 35, 36 in the same fashion as bar 182, the rear end of plate 237 merely resting upon the top edge of frame 37. The leading edge of the paper unwound from the roll or the first form is inserted between the platen 112 and roller 120. The guide comprising links 192 and rods 190, 193 must be raised and turned back over the stacker. The end of the paper emerging above the platen must be guided away from the stacker fingers and conveniently may be draped over the top of the stacker.

An important feature of the bill feed attachment described herein is its flexibility and adaptability from both manufacturer's and user's standpoints. It can be used with almost any type of accounting machine employing a platen for printing and with any machine using grouped type bars of conventional form regardless of their grouping. By simple adjustments alone, or at most, simple adjustment in connection with substitution of spacers as described, the attachment may be changed with almost no delay to accommodate bill forms of any size up to the maximum width of the supply hopper.

By virtue of the constructions of the various feed mechanisms slight differences in the various lots of blank forms delivered by the printers may be readily compensated by simple adjustment resulting in neater and more attractive bills.

Notwithstanding the many improved results obtained the bill feed attachment described herein is relatively much simpler than prior attachments of this type.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a bill feed attachment for accounting machines, a platen adapted to feed bills, feed rollers auxiliary to the platen and supplementing feeding of bills by the platen, a drive shaft, a crank driven by said shaft and having a radially adjustable crank pin, a unidirectional clutch, gearing between said clutch and the platen and feed rollers, and a link connecting the crank pin and clutch.

2. In a bill feed attachment for accounting machines, a platen adapted to feed bills, feed rollers auxiliary to the platen and supplementing feeding of bills by the platen, a drive shaft, a crank driven by said shaft and having a radially adjustable crank pin, a unidirectional clutch, gearing between said clutch and the platen and feed rollers, a link connecting the crank pin and clutch, manual means for disengaging the clutch, a latch for holding the clutch disengaged, and means automatically effective during the operation of the bill feeding attachment for releasing the latch.

3. In a bill feed attachment for accounting machines, bill feed elements, a driving element for said feed elements, a driven element, rollers between said driving and driven elements active when the driving element is oscillated in one direction to rotate the driven element and inactive when the driving element is oscillated in the opposite direction, an adjustable device for oscillating said driving element, manual means for shifting the rollers to prevent rotation of the driving element by the driven element, means for holding the rollers in shifted position, and a device effective when the driving element is oscillated to release the holding means.

4. A paper guide for accounting machines having platens comprising a pair of bars parallel with the platen, said bars having grooves cut therein; flexible elements laid in said grooves and curved partly around the platen, and means carried by one of said bars for securing said elements.

5. A paper guide for accounting machines provided with a platen comprising a support bar extending below the printing line on the platen and parallel with the latter, said bar having on one face thereof vertical grooves at spaced intervals, a second bar extending above the printing line on the platen and having vertical grooves to correspond with the grooves in the support bar, and guide elements laid in the grooves of the support bar and sprung into the grooves of the second bar, said elements being composed of resilient material curved to partly conform to the contour of the platen.

6. A paper guide for accounting machines having a platen, comprising a support bar parallel with the platen on one side of the printing line, a second bar parallel with the platen on the opposite side of the printing line, said bars having coacting grooves therein at spaced intervals; and a series of resilient elements secured in the grooves of the support bar and sprung into the coacting grooves of the other bar, said elements guiding work sheets in front of the platen.

7. In combination with the frame of an accounting machine, printing mechanism carried by said frame, a bill feed attachment pivotally mounted in the frame to permit raising said attachment for inspection, and means for leveling and aligning said attachment in said frame and relative to the printing mechanism.

8. A bill feed attachment for accounting machines comprising a bill supply hopper, means for removing one bill at a time from said hopper, feed rollers adapted to grip each bill as it is removed by said means and carry said bill to a position of temporary rest, a second set of feed rollers for carrying the bill from said position of rest to a printing position, adjustable means for varying the distance the bill is carried by said second feed rollers, a storage hopper, and stacking means for carrying a bill received from the second feed into the storage hopper.

9. A paper guide device for bill feeding attachments comprising a fixed guide table, a pair of parallel rods, means for pivotally supporting one of said rods, a plurality of links connecting said rods and adapted to be adjusted along said rods, said links extending in front of the fixed guide and adapted to hold a bill close to the fixed guide in a position to permit visual inspection of the bill, and a catch for the other of said rods to hold the links close to the fixed guide, said catch being manually releasable to permit the assembly comprising the links and rods to be rocked away from the fixed guide to permit removal of a bill from between said links and fixed guide.

10. In a bill feeding attachment, a printing platen rotatable to feed bills and adapted to support and back the bills while they are being printed upon, a cylindrical stacker, a fixed guide between the stacker and platen, a rod pivoted adjacent the stacker and parallel with the latter, a second rod parallel with the platen and first rod and adjacent the edge of the fixed guide nearest the platen, and links connecting said rods and adapted to cooperate with the fixed guide to guide a bill from the platen to the stacker, said links being adjustable along said rods to permit maximum visibility of the printed matter on a bill guided between said links and fixed guide.

11. A paper guide for bill feeding attachments having a platen, comprising a pair of bars adjacent and parallel with the platen, one of said bars being fixed and the other removable, releasable means for holding the removable bar, bill guide elements secured to one of said bars and loosely engaged by the other of said bars, said elements being settable along said bars in accordance with a predetermined plan and adapted when the removable bar is removed to permit removal of bills jammed about the platen and when the removable bar is in place to guide bills in front of the platen.

12. In a bill feed attachment for accounting machines having printing mechanism and a driving motor therefor, a bill supply hopper, means for removing bills from said hopper and transporting said bills to the printing mechanism by continuous feeding movements, a movable bill sensing device between said hopper and printing mechanism and adapted when in one position to sense the bills while they are moving from hopper to printing mechanism and when moved to another position to be inoperative to sense bills, means controlled by said device for stopping the motor when bills become exhausted from the hopper, and a manually operable device for moving the bill sensing device to its inoperative position.

13. In a bill feed attachment for accounting machines, an adjustable crank pin movable in an arc; an overrunning clutch comprising a driving element, a driven element, and a series of rollers interposed between said elements; a link connecting said crank pin to the driving element of the clutch, bill feed rollers actuated by the driven element of the clutch, a brake shoe adapted to directly engage the driven element of the clutch, and means to constantly engage the brake shoe with the driven element.

14. In a bill feed attachment, feed rollers, means to rotate said rollers by hand, a drive shaft, adjustable means connecting said shaft and feed rollers including a clutch, manual means for disengaging the clutch when the feed rollers are to be turned by hand, means to hold the clutch disengaged, and means operative upon rotation of the drive shaft to automatically release the holding means.

15. A paper guide comprising a pair of parallel supports, and resilient guide elements removably secured in one of said supports at predetermined intervals and sprung into grooves formed in the other support.

16. A paper guide comprising a pair of spaced supports provided with confronting grooves, and a series of resilient guide wires secured in the grooves of one support and sprung into the confronting grooves of the other support.

17. In combination with the framework supporting the printing mechanism of an accounting machine, a bill feed attachment, means to pivot one end of said attachment in said framework, means to adjust the pivots vertically and transversely of their axes to level the bill feed attachment and adjust it relative to the printing mechanism, a support bar loosely mounted in said framework, and leveling means carried by said bar and operative to level the end of the bill feed attachment opposite the pivot means.

18. In combination with the frame supporting paper feed mechanism, a support fixedly mounted in the frame, a second support extending parallel with the first support and spaced therefrom, means for freely removably supporting the second support including a spring actuated catch, and a plurality of resilient guides secured at predetermined intervals to one of said supports and sprung into recesses in the other support.

19. A paper guide for paper feeding mechanism comprising a pair of spaced supports, means for pivotally mounting one of said supports, and a series of guide elements connecting said supports and adjustable longitudinally of the latter, said supports and guide elements pivoting as a unit on the mounting means.

20. In combination with the frame supporting a bill feeding mechanism, a cross rod pivotally mounted in said frame, a second cross rod parallel with the first rod and spaced therefrom, paper guide elements slidable along both rods, and means to adjustably secure said guide elements along said rods, said rods and guide elements when secured to the rods forming a rigid paper guide swingable about the axis of the first rod.

21. In a bill feed mechanism, a drive shaft, stacking mechanism including a rotary stacker drum having means to grip a bill and stack it, and means connecting said shaft and stacker drum whereby the stacker drum is driven at a variable rate of speed varying from zero to a maximum and back to zero.

22. In a bill feeding attachment, a drive shaft, bill stacking mechanism normally at rest, and means connecting the stacking mechanism and drive shaft whereby the latter drives said mechanism at a non-uniform speed varying from zero to a maximum and back to zero.

23. A paper guide for bill feeding and like attachments comprising a rod supported with its axis fixed relative to the framework of said attachment, a series of paper guide elements adjustable along said rod and pivoting about the axis of the first rod, and a second rod supported by the guide elements parallel with the first rod along which second rod the guide elements are adjustable.

24. A paper guide comprising a pair of spaced parallel supports, guide elements extending at right angles to said supports and joining same at predetermined intervals, said elements being removably mounted in said supports.

WALTER P. SCHARR.